Dec. 2, 1941.  O. E. ROSEN  2,264,891
CLUTCH
Filed Sept. 25, 1939
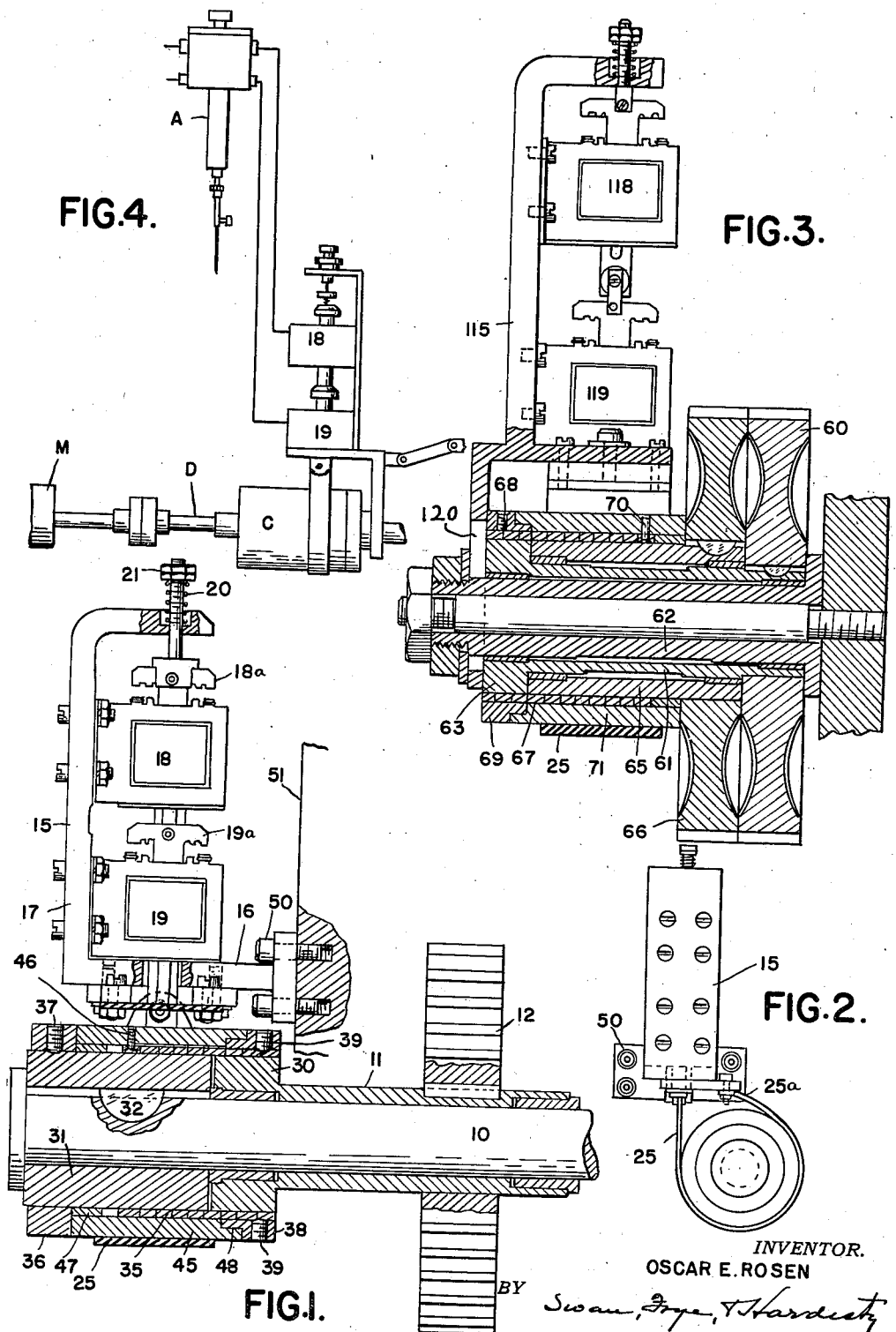
INVENTOR.
OSCAR E. ROSEN
BY Swan, Frye, T Hardesty
ATTORNEYS Patented Dec. 2, 1941

2,264,891

UNITED STATES PATENT OFFICE 2,264,891

CLUTCH

Oscar E. Rosen, Detroit, Mich.

Application September 25, 1939, Serial No. 296,335

1 Claim. (Cl. 192—81)

The present invention relates to automatic clutch devices, for use in connection with the feeding mechanism of machine tools, and to control means therefor.

While the present invention is intended for use particularly with tracer controlled duplicating machines, it is undoubtedly of wider application and should not be considered as limited to the specific use.

In my United States Letters Patent No. 2,138,208, issued November 29, 1938, there is described a tracer controlled feed unit adapted to be connected to machine tools, such as milling machines, lathes, etc., the drive from the unit being applied to a feed screw or shaft actuating such screw. In this patented device, no provision is made for regulating the rapidity of feed in accordance with the angle of inclination of the pattern with which the tracer is in contact.

For example, if the tracer encounters an abrupt rise on the pattern, it is obvious that the forward progress of the work should be slower or even stopped, in order to allow the cutter to make a corresponding rise. The same would be true if the pattern presented an abrupt down slope or a hole.

The present invention has among its objects means for automatically slowing or stopping the forward movement under such conditions.

It has as another object automatic means for disconnecting the drive from the forward feed means when the tracer strikes an obstruction or fails to contact the pattern.

Still another object is clutch means interposed in the feed means.

Another one of the objects of the invention is a clutch and control which, as indicated above, is substantially instantaneous in clutching and declutching.

Another object is a clutch unit which may be quickly and easily installed upon conventional cutting machines to control the feed thereof.

And another object is the automatic control of such clutch means.

Other objects will readily occur to those skilled in the art upon reference to the following description and the accompanying drawing, in which Figure 1 is a central vertical section through one form of the clutch.

Figure 2 is an end elevation thereof.

Figure 3 is a central vertical section of another form of the clutch; and

Figure 4 is a more or less diagrammatic representation of the electrical connection to a tracer and to a feed shaft of a cutting machine.

In the drawing, Figure 1 shows a clutch mechanism that is constructed and arranged to be set into a drive shaft of a cutting machine, for example, a milling machine. The drive shaft, for example, is the one that actuates the feed screw that causes the work table to move past the cutter or the cutter to move past the work as the case may be.

The shaft is shown at 10, being driven through the clutch mechanism by the sleeve 11 to which is keyed a drive gear 12.

The clutch mechanism, as shown, comprises a bracket 15 which includes a platform 16 and an upright portion 17 for the support of two solenoids 18 and 19, one above the other. These solenoids are each provided with an armature, 18a and 19a, and the two armatures are fixed together and held in their upper idle position by a suitable spring 20 adjustably positioned by a thumb screw 21. Further, the two armatures are so positioned that energizing either solenoid will cause the two to move downwardly.

To the lower end of the armature couple is fixed one end of a loop 25 of flexible material, shown in the drawing as a piece of flat belt material, the other end of the loop being fixed as at 25a to the bracket 15. This loop 25 passes around the clutch mechanism and coacts therewith as will be described.

In the clutch mechanism, the sleeve 11, at the clutch end, is enlarged somewhat to provide a cylindrical portion 30, of the same outside diameter as that of a sleeve 31, which is keyed, as at 32, to the extended end of shaft 10, the sleeve 31 and portion 30, forming in effect a cylinder of considerable area, but the two parts of which are independent of each other.

Around the so formed cylinder is a helical clutch element 35 which extends to the extreme edge of portion 30 and to near the far edge of sleeve 31 where it abuts a ring 36 fixed to the latter, as by a set screw 37. This helix 35 is fixed to portion 30 by means of an embracing ring 38 through which and into the helix pass screws 39.

Overlying the helix 35 and between rings 36 and 38 is a sleeve 45 and to this the free end of helix 35 is fixed as by means of a pin 46.

This sleeve 45 is of sufficiently large inside diameter to permit slight expansion of the helix 35 and is supported upon a suitable ring 47 at one end and upon a step 48 formed on ring 38.

The belt 25, above mentioned, is so adjusted that it lies around sleeve 45 when the solenoids 18 and 19 are inactive, and is sufficiently tight to retard the sleeve. Retarding the sleeve 45 and with it the end of the helix 35, being carried around thereby, causes the latter to wind tightly against parts 30 and 31 so that these two parts are coupled together. When, however, the solenoids (either of them) are energized, the belt will be loosened and, the sleeve 45 being thus released, the helix will be allowed to unwind and expand, and the two parts 30 and 31 thereby uncoupled.

The bracket 15 may be fixed against rotation with the clutch assembly by securing it, as by screws 50, to a suitable portion 51 of the machine.

In Figure 3 is shown a form of the clutch particularly adapted for use with a lathe. In this form, the power is applied by a gear (not shown) to the gear 60. This gear 60 is keyed to a sleeve 61 rotatably carried on a stud 62. This sleeve 61 at the end opposite gear 60 is outwardly flanged as at 63 to correspond to portion 30 in Figure 1.

Rotatably mounted upon sleeve 61 is a second sleeve 65 to which is fixed a gear 66 and this sleeve 65 is of the same diameter as flange 63, forming therewith a two part cylinder as in the previous form. Thus formed the cylinder is surrounded by a helical spring 67 fixed at one of its ends to flange 63 as by a screw 68 and ring 69. The other end of helix 67 is fixed as by pin 70 to an enclosing sleeve 71 around which lies the belt 25.

The belt 25 is actuated in the same fashion as already described by solenoids 118 and 119, and, as stated, when the loop is tightened, the drive gear 60 is clutched to the driven gear 66. The latter through suitable gearing (not shown) of course drives the lathe feed screw. In this form, the bracket 115 carrying the solenoids, is also carried by stud 62, a suitable slot 120 cooperating with flattened sides on the stud to prevent rotation and permit adjustment of the belt 25.

Figure 4 is a more or less diagrammatic showing of the connection of the tracer and clutch and the use of the tracer in controlling the progressive feed of the cutting machine in accordance with the angle of cut.

In this figure, the tracer A will be mounted upon the cutting machine in position to trace the profile of a pattern which is being moved in a path having the same relation to the path of the work as the relation of the position of the tracer to the position of the cutter. Further the clutch C will be placed in a position intermediate the ends of a feed drive shaft D of a machine M.

With solenoid 18 connected to one of the tracer contacts and solenoid 19 connected to the other tracer contact, and with the two tracer contacts also connected to the valve controlling the solenoids in the cutting machine control unit of Patent No. 2,138,508, it will be seen that when either of the tracer contacts are made, one of the solenoids 18 or 19 will be energized to cause the clutch C to disconnect the parts of the drive shaft D, and the more frequent and longer the contacts, the more continuous will be the declutching action. It should be noted that the spring 20 supporting the armatures 18a and 19a should be of sufficient strength to maintain the armatures "up" under conditions wherein either solenoid is energized only substantially instantaneously. The inertia of the armatures and the connecting rod will of course aid this action. When, however, the tracer strikes an obstruction, for example, a vertical wall, the prolonged contact thus made in the tracer will cause a continuous energization of one of the solenoids 18 or 19 and release the clutch while the machine operating unit moves the tracer and cutter vertically along the pattern and work.

Likewise, when the tracer drops from an edge the progressive action of work and pattern is halted until the tracer again strikes something.

Further, on quite steep sloping surfaces, the relatively long contacts in the tracer will produce a slower progressive action due to clutch slippage.

The present application is directed to matter disclosed but not claimed in my application, Serial No. 245,710, filed December 14, 1938, for "Control devices for duplicating machines."

I claim:

For use with the feed drive means for a cutting machine, a clutch assembly having a rotatable outer clutch operating sleeve carrying one end of a helical spring and adapted, when retarded, to cause contraction of said spring and thereby clutching condition, a stationary support adjacent said assembly and carrying solenoid means provided with a movable armature, a belt attached at one end to said support and surrounding and in contact with said sleeve, said belt having its other end attached to said armature, resilient means for maintaining contact between said belt and sleeve, whereby to maintain said clutch in clutched condition, and means to energize said solenoid means to thereby move said armature to counteract the tension of said resilient means and loosen said belt.

OSCAR E. ROSEN.